United States Patent
Ueno et al.

(10) Patent No.: US 6,480,761 B2
(45) Date of Patent: Nov. 12, 2002

(54) BATTERY-DRIVEN LEGGED ROBOT AND METHOD OF CONTROLLING THE SAME

(75) Inventors: Kenichiro Ueno, Kanagawa; Osamu Koyama, Tokyo, both of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/862,401

(22) Filed: May 21, 2001

(65) Prior Publication Data

US 2002/0007230 A1 Jan. 17, 2002

(30) Foreign Application Priority Data

May 22, 2000 (JP) ....................... 2000-149338

(51) Int. Cl.$^7$ ............................................. G06F 19/00
(52) U.S. Cl. ..................... 700/245; 700/246; 700/247; 700/251; 700/253; 700/260; 318/568.1; 318/568.11; 318/568.12; 318/568.16; 318/568.17; 318/568.2; 901/1; 901/9; 701/23
(58) Field of Search ................... 700/56, 245, 246, 700/251, 253, 260, 261, 248, 247, 258; 318/568.1, 568.2, 568.11, 568.12, 568.16, 568.17; 901/1, 9, 46, 47; 180/8.6, 8.1; 701/23

(56) References Cited

U.S. PATENT DOCUMENTS 5,158,493 A * 10/1992 Morgrey .................. 180/8.6
5,378,969 A * 1/1995 Haikawa .................. 180/8.1
6,266,578 B1 * 7/2001 Okada et al. .............. 700/245

FOREIGN PATENT DOCUMENTS

EP    1 103 451 A2 * 5/2001

OTHER PUBLICATIONS

Ishida et al. Motion entertainment by a small humanoid robot, 2001, Internet/IEEE, pp. 1079–1086.*

Hirai et al., The development of Honda humanoid robot, 1998, IEEE, pp. 1321–1326.*

* cited by examiner

Primary Examiner—William A. Cuchlinski, Jr.
Assistant Examiner—McDieunel Marc
(74) Attorney, Agent, or Firm—Frommer Lawrence & Haug LLP; William S. Frommer

(57) ABSTRACT

When the remaining capacity of a battery of a robot comes to a low level at a position in an operational area, power consumption can be reduced, thereby extending the life of the battery, by changing control parameters used by actuators and successively suspending operations of driving members of which the suspension of operations does not significantly affect the motion using a leg unit. Therefore, the robot can operate for a longer time, and energy, which is required for the motion for connection to a charging station or an external power supply device, can be maintained.

26 Claims, 10 Drawing Sheets

SIDE VIEW FRONT VIEW

SIDE VIEW TOP VIEW

SIDE VIEW TOP VIEW

BATTERY-DRIVEN LEGGED ROBOT AND METHOD OF CONTROLLING THE SAME

BACKGROUND OF THE INVENTION

1. Field of the Invention

The present invention relates to intelligent movable robots which are freely movable along unlimited paths in operational areas. In particular, the present invention relates to a movable robot which is freely movable along an unlimited path in an operational area by using a rechargeable battery and without being restricted by an external power-source cable.

More particularly, the present invention relates to a method of controlling an electrical power for a movable robot which is freely movable along an unlimited path in an operational area so that the movable robot does not operate uncontrolled or tumble even when the remaining power of the battery becomes low at a position in the operational area.

2. Description of the Related Art

A mechanical apparatus, which performs movements similar to those of a human being by using electrical and/or magnetic effects, is called a "robot". The term "robot" is said to be originated from a Slavic word "robota" which means a slave-machine. In Japan, the robots began to be widely used in the late 1960s, most of which were industrial robots, such as manipulators and transfer robots, serving for automated and unmanned manufacturing operations in factories.

A stationary robot, such as an arm-type robot which is fixed so as to be used in a particular place, is operated only in a limited small operational area such as for assembly and selection of component parts. On the other hand, a movable type robot can operate in an unlimited operational area, is movable along a predetermined or unlimited path, and performs a predetermined or any operation on behalf of human beings, so as to provide various wide services which replace for those offered by live bodies including human beings, dogs, and others. Particularly, a movable legged robot is superior to the other movable type robots, in that a flexible walking or traveling motion, such as ascending and descending steps and chairs and climbing over barriers, is possible regardless of the condition of walking or traveling area of the legged robot, although attitude control and movement control are difficult because the legged robot is instable compared with a crawler-type robot or a robot having tires.

Recently, studies have been advanced concerning legged robots including a pet-type robot which copies the physical mechanism and motions of four-legged animals, such as cats and dogs, and a "man-shaped" or "man-type" (humanoid) robot which is designed by using the physical mechanism and motions of two-legged lives, such as human beings, as models, and practical applications of these robots are more expected.

Most of the working and residential areas of the human beings are formed in accordance with the physical mechanism and operation patterns of the human beings which move by using two legs. In the residential area of the human beings, there are too many obstacles for existing mechanical systems which use wheels and the like as driving mechanisms for moving. The mechanical system, that is, a robot is preferably formed to have substantially the same range of movement as that of the human beings so that the robot can assist or substitute for the human beings in their operations and further penetrate into the human life. This is the reason why the practical use of legged robots is looked forward. It is indispensable for the robots to have shapes of the human beings so that the robots can be adapted to the human life.

The man-shaped robots perform various operations of industrial production activities and the like for the human beings, for example, maintenance operations for nuclear and thermal power generation plants and petrochemical plants, transfer and assembly operations for component parts in manufacturing plants, cleaning of high-rise buildings, and rescue works in sites of fires which are operations dangerous or difficult to the human beings to perform.

The man-shaped robots may be also used in a "symbiotic relationship" and for "entertainment". In these types of use, the robots are characterized more in living together with the human beings than in assistance of the human life.

The robots described above are electric-motor-driven mechanical devices; therefore, the electrical supply to the devices is indispensable.

In a stationary robot such as an arm-type robot which is fixed so as to be used in a particular place, or in a movable robot of which the action radius or operation patterns are limited, the power can be supplied from a commercial AC power source via a power cable.

On the other hand, in an independent type robot which freely moves, the power supply from the commercial AC power source is not possible because the action radius of the robot is restricted by the power cable. Therefore, the movable robot is independently driven by a rechargeable battery. The battery-driven movable robot is independently movable in a residential area of the human beings or in various operational areas without considering physical restriction of the position of power sockets and the length of a power cable.

For example, in a mechanical device such as the man-shaped robot, which has a multidegree of freedom, that is, numbers of joint-actuators, of which the power consumption is great, a high-capacity and high-output battery is required for supplying an inrush current when starting actuators. Particularly, strong actuators are required for leg members, thereby consuming large power. Therefore, the weight of a battery increases so as to occupy 10 to 20% of the total weight of the robot, and, in turn, the increase of the weight causes greater consumption of the power. However, the robot is still preferably driven by a battery in order to be free from interference of legs of the robot with the power cable and restriction of the action radius due to a limited length of the power cable and to maintain the freedom of action of the robot.

A difficult point of a battery-driven mechanical device is a battery-charge operation. Particularly, although the movable robot is used as an automatic device or unmanned machine, charging operation cannot be automatically performed. The operation of battery replacement and connection to a power source for charging is a laborious work for users.

For example, when the man-shaped robot must suspend its operations so as to manually perform charging of the battery every time when the capacity of the battery decreases while the robot is assisting or substituting for the human beings in various occasions happening in a residential area, it cannot be said that the robot performs its roll as a partner of the human beings, but it must be said that the human beings serve as assistants to the robot.

In order to automate the battery-charging operation for movable robots, so-called a "charging station" is used. The charging station is an exclusive space for charging batteries of the movable robots.

A method of charging a battery of a battery-driven robot at a charging station, which freely moves along an unlimited path in an operational area, is disclosed in, for example, Japanese Patent Application No. 11-308224, the right of which has been transferred to the assignee of the present invention, in which visible identification data are disposed in a predetermined position of the charging station, and a legged movable robot is provided with an imaging unit, a computing unit for computing the distance and direction of the charging station from the movable robot in accordance with a captured image, and a searching unit for making the movable robot to search the charging station in accordance with the result of computation by the computing unit. The legged movable robot can search the charging station by chasing the visible identification data by a camera, thereby automating the charging operation.

Another method of charging a battery of a movable robot at the charging station is disclosed in, for example, Japanese Patent Application No. 11-366651, the right of which has been transferred to the assignee of the present invention, in which a legged movable robot independently determines the time at which the battery-charging is required, and drops in the charging station for charging, whereby assistance of a user or the like is not necessary. The user becomes free from a laborious charging operation, and it is not necessary for the user to consider the time to charge a battery. In a match game between legged robots, the spectators can enjoy the game (for example, soccer) without loosing continuity and reality of the game.

However, an intelligent robot which independently moves along an unlimited path in an operational area does not always happen to be close to a charging station when the battery should be charged.

When a full operation of the robot continues when the remaining capacity is low, discharging of the battery is accelerated, and there is a risk in that the battery is completely discharged before the robot reaches the charging station.

When an unplanned operation-pattern is performed at the time when the power is cut off, the robot tumbles down to a floor while being in an unnatural position. In this case, there is a risk of seriously damaging the robot or an object with which the tumbling robot collides, an economical effect of repairs being serious. Particularly, a man-shaped legged robot is tall and has its center of gravity at an elevated level; therefore, damages due to the tumble caused by unexpected interruption of power becomes more serious.

SUMMARY OF THE INVENTION

Accordingly, it is an object of the present invention to provide an intelligent robot freely movable along an unlimited path in an operational area.

It is another object of the present invention to provide a superior movable robot which is freely movable by using a rechargeable battery along an unlimited path in an operational area without being restricted by an external power cable.

It is still another object of the present invention to provide a superior technology of power control of a movable robot which is freely movable along an unlimited path in an operational area.

It is a further object of the present invention to provide a superior technology of power control of a movable robot, in which the movable robot does not operate in an unplanned state nor tumble due to interruption of power supply.

To these ends, according to an aspect of the present invention, a battery-driven legged robot, which comprises at least one movable leg unit and at least one driving member including the driving member for driving a trunk, comprises a control unit for outputting a control signal for instructing driving of the driving member; a power-control unit for monitoring the state of a battery; and a power supply-block unit for supplying and blocking driving power to the driving member in accordance with the state of the battery monitored by the power-control unit.

The control unit may block the output of the control signal to the driving member to which the driving power has been blocked.

The battery-driven legged robot may further comprise at least one device of an attitude sensor, an image input device, and a sound input-output device. The power-control unit may block the driving power to the at least one device of the attitude sensor, the image input device, and the sound input-output device when power of the battery decreases below a predetermined value, thereby reducing power consumption.

The battery-driven legged robot may further comprise a head unit. The power-control unit may block the driving power to the head unit before blocking the driving power to the movable leg unit, when the power of the battery decreases below a predetermined value, whereby a motion using the movable leg unit can be continued while reducing the power consumption.

The battery-driven legged robot may further comprise an arm unit. The power-control unit may block the driving power to the arm unit before blocking the driving power to the movable leg unit, when the power of the battery decreases below a predetermined value, whereby the motion using the movable leg unit can be continued while reducing the power consumption.

The battery-driven legged robot may further comprise a trunk unit. The power-control unit may block the driving power to the trunk unit before blocking the driving power to the movable leg unit, when the power of the battery decreases below a predetermined value, whereby the motion using the movable leg unit can be continued while reducing the power consumption.

The control unit may provide an instruction to change a control parameter for the at least one driving member when the control unit receives information from the power-control unit that the power of the battery has decreased below a predetermined value.

The control unit may change a controlled motion set for the at least one driving member when the control unit receives information from the power-control unit that the power of the battery has decreased below a predetermined value.

The above-described change of the controlled motion may include a change of a target position of movement set for the driving member, suspension of movement of the at least one driving member, a motion for connecting to an external power supply device, and a movement to a stable position in which the center of gravity of the legged robot is disposed sufficiently low and suspension of the supply of the driving power to substantially all the driving members when the legged robot is in the stable position.

When the battery-driven legged robot comprises the head unit, the arm unit, and the trunk unit, the power-control unit may block, in the switching step, the driving power to the head unit, the arm unit, and the trunk unit, one after another, when the power of the battery decreases below a predetermined value, whereby the motion using the movable leg unit can be continued while reducing the power consumption.

According to another aspect of the present invention, a method of controlling a battery-driven legged robot is provided, the legged robot comprising at least one movable leg unit and at least one driving member including the driving member for driving a trunk. The method of controlling a battery-driven legged robot comprises the steps of monitoring the state of a battery; and switching between supply and blocking of driving power to the at least one driving member in accordance with the state of the battery monitored in the monitoring step.

The method of controlling a battery-driven legged robot may further comprise the step of blocking an output of a control signal to the driving member to which the driving power has been blocked.

In the method of controlling a battery-driven legged robot, the legged robot may further comprise at least one device of an attitude sensor, an image input device, and a sound input-output device. In the switching step, the driving power to the at least one device of the attitude sensor, the image input device, and the sound input-output device may be blocked when determined in the monitoring step that power of the battery has decreased below a predetermined value, thereby reducing power consumption.

In the method of controlling a battery-driven legged robot, the legged robot may further comprise a head unit. In the switching step, the driving power to the head unit may be blocked before blocking the driving power to the leg unit, when determined in the monitoring step that the power of the battery has decreased below a predetermined value, whereby a motion using the movable leg unit can be continued while reducing the power consumption.

In the method of controlling a battery-driven legged robot, the legged robot may further comprise an arm unit. In the switching step, the driving power to the arm unit may be blocked before blocking the driving power to the leg unit, when determined in the monitoring step that the power of the battery has decreased below a predetermined value, whereby the motion using the movable leg unit can be continued while reducing the power consumption.

In the method of controlling a battery-driven legged robot, the legged robot may further comprise a trunk unit. In the switching step, the driving power to the trunk unit may be blocked before blocking the driving power to the leg unit, when determined in the monitoring step that the power of the battery has decreased below a predetermined value, whereby the motion using the movable leg unit can be continued while reducing the power consumption.

The method of controlling a battery-driven legged robot may further comprise the step of providing an instruction to change a control parameter for the at least one driving member when determined in the monitoring step that the power of the battery has decreased below a predetermined value.

The method of controlling a battery-driven legged robot may further comprise the step of changing a controlled motion set for the at least one driving member when determined in the monitoring step that the power of the battery has decreased below a predetermined value.

The above-described change of the controlled motion may include a change of a target position of movement set for the driving member, suspension of movement of the at least one driving member, a motion for connecting to an external power supply device, and a movement to a stable position in which the center of gravity of the legged robot is disposed sufficiently low and suspension of the supply of the driving power to substantially all the driving members when the legged robot is in the stable position.

In the method of controlling a battery-driven legged robot, when the legged robot comprises the head unit, the arm unit, and the trunk unit, the driving power to the head unit, the arm unit, and the trunk unit may be blocked, one after another, in the switching step, when the power of the battery decreases below a predetermined value.

According to the present invention, when the remaining capacity of a battery of the robot comes to a low level at a position in an operational area, power consumption can be reduced, thereby extending the life of the battery, by changing control parameters used by actuators and successively suspending operations of driving members of which the suspension of operations does not significantly affect the motion using leg units.

Therefore, the robot can operate for a longer time, and energy which is required for the motion for connection to a charging station or an external power supply device can be maintained.

According to the present invention, when the remaining capacity of a battery of the robot comes to a low level at a position in an operational area, the robot changes its position to that in which the robot is, for example, sitting down, lying on its face, or lying on its back, so that it is not necessary for the driving members to drive (to consume power for) the leg unit and the like for maintaining the position of the robot, and the center of gravity of the robot is sufficiently low, whereby a risk of damaging the robot and an object with which the robot collides by tumbling can be avoided.

Further objects, features, and advantages of the present invention will become apparent from the following detailed description of the embodiments according to the present invention with reference to the attached drawings.

DESCRIPTION OF THE PREFERRED EMBODIMENTS

Embodiments according to the present invention are described below with reference to the drawings.

Figure 1:
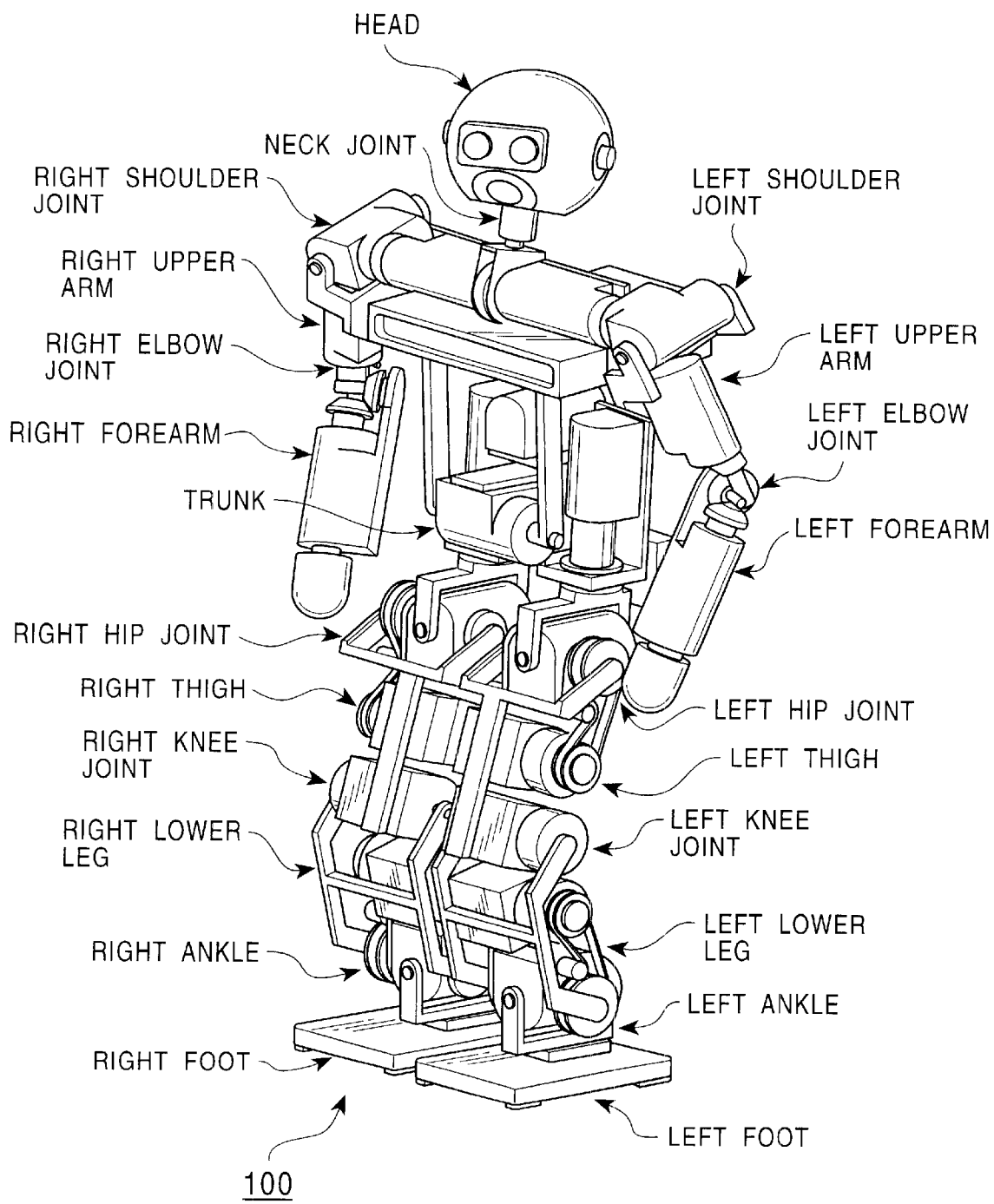
FIG. 1 is a front view of a legged robot 100 according to an embodiment of the present invention.
Figure 2:
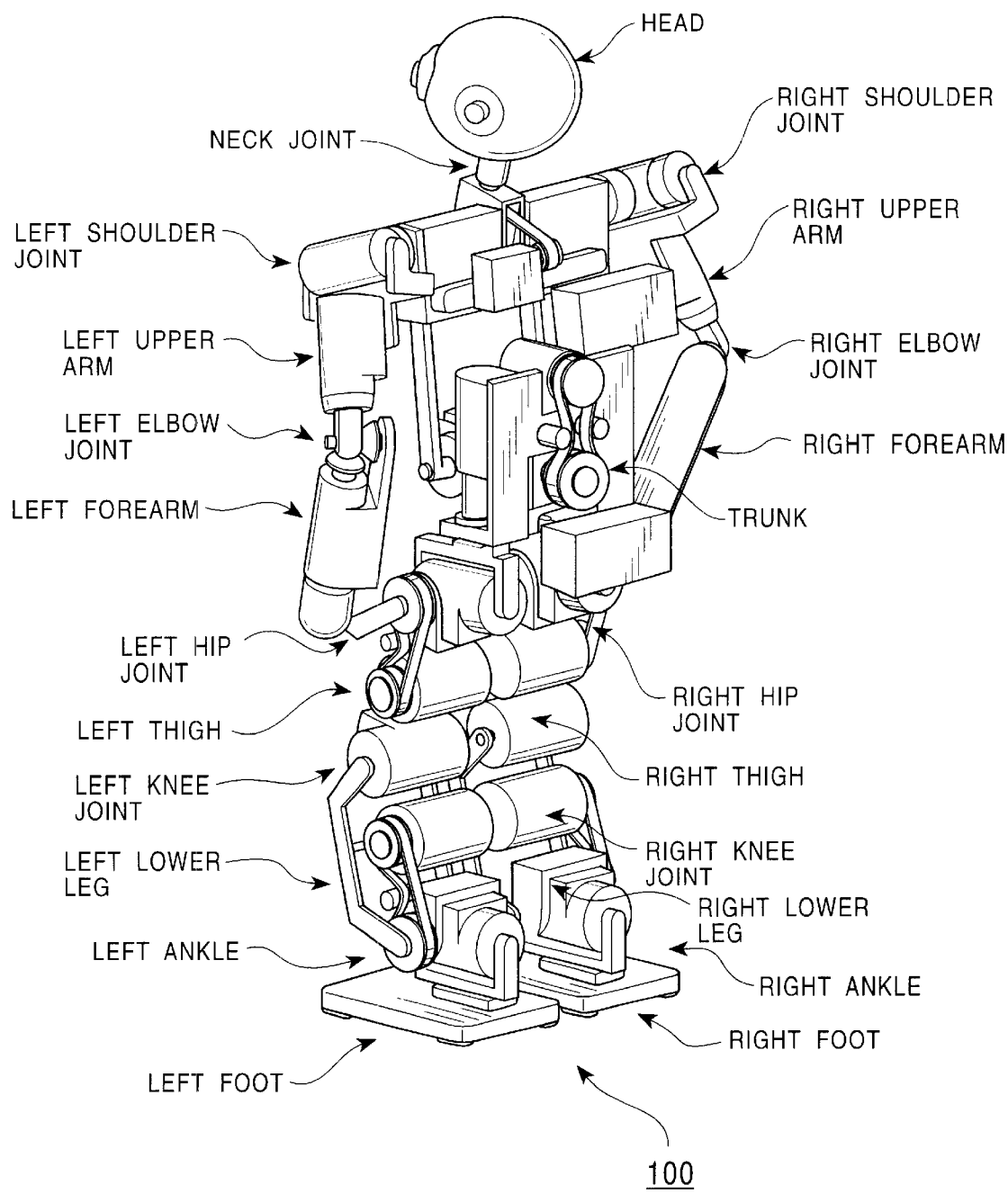
FIG. 2 is a rear view of the legged robot 100 according to the embodiment of the present invention.

FIGS. 1 and 2 are front and rear views, respectively, of a standing "man-shaped" or "man-type" legged robot 100 according to an embodiment of the present invention. The legged robot 100 includes two lower limbs for walking, a trunk, two upper limbs, and a head.

The two lower limbs each include a thigh, a knee joint, a lower leg, an ankle, and a foot, each lower limb being connected to the trunk via a hip joint substantially at the lower end of the trunk. The two upper limbs each include an upper arm, an elbow joint, and a forearm, each upper limb being connected to the trunk via a shoulder joint at a side of the upper end of the trunk. The head is connected to the trunk via a neck joint substantially at a central part of the upper end of the trunk.

A trunk unit is provided therein with a control unit which is not shown in FIGS. 1 and 2. The control unit which is received in a casing includes a controller (main control unit) for drive-control of joint-actuators and for processing inputs from the outside via sensors (described below), power-source circuit, and other peripheral devices. The control unit may also include communications interface and communications apparatus for remote control.

Figure 3:
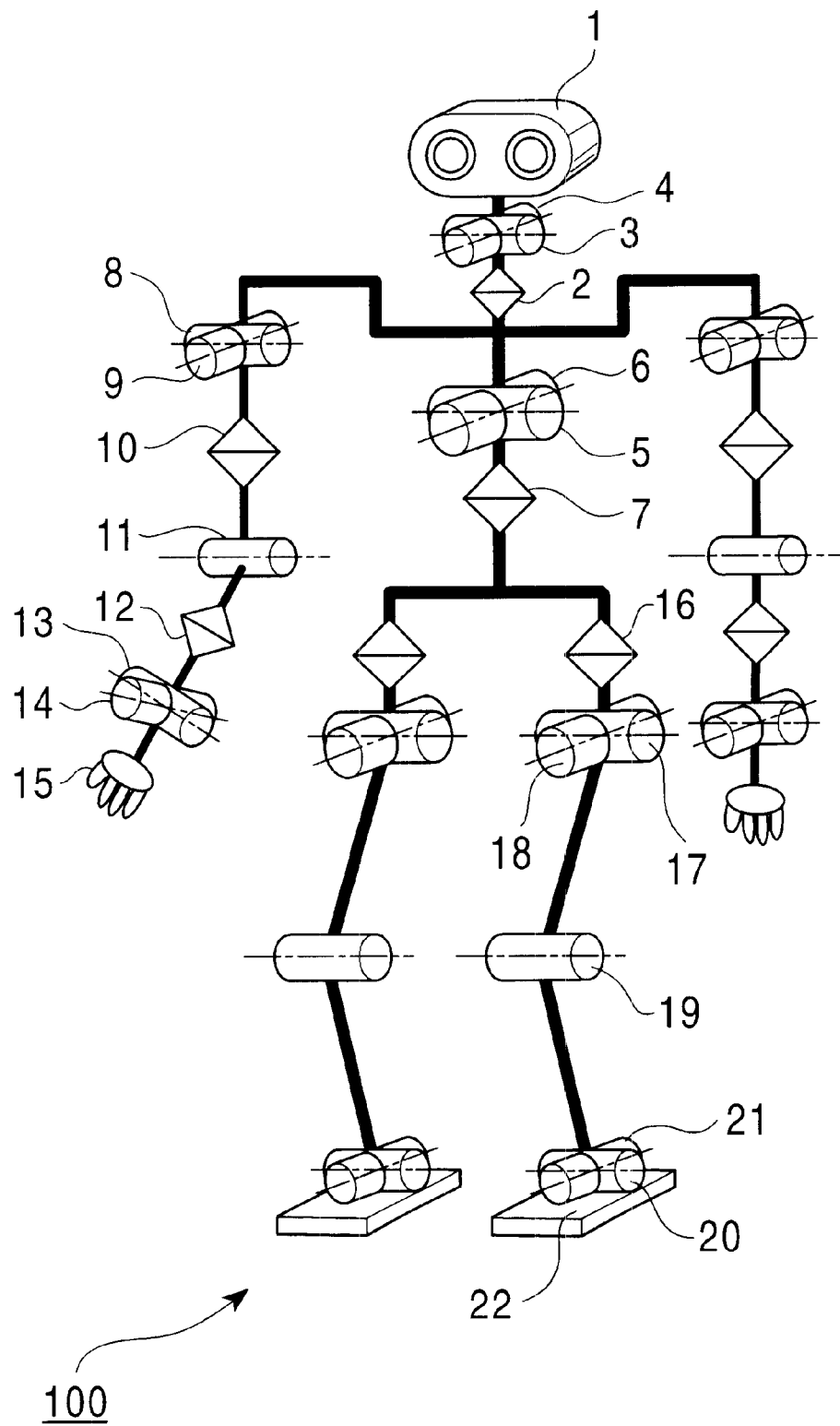
FIG. 3 is a schematic view of a model showing the degree of freedom of the legged robot 100 according to the embodiment of the present invention.

FIG. 3 is a schematic view of a model showing the degree of freedom of the legged robot 100 according to the present embodiment. The legged robot 100 includes the two upper limbs, a head 1, the two lower limbs for walking, and the trunk which connects the upper limbs and the lower limbs.

The neck joint supporting the head 1 has three degrees of freedom of movement at a neck-joint yaw axis 2, a neck-joint pitch axis 3, and a neck-joint roll axis 4.

Each upper limb has degrees of freedom at a shoulder-joint pitch axis 8, a shoulder-joint roll axis 9, an upper-arm yaw axis 10, an elbow-joint pitch axis 11, a forearm yaw axis 12, a wrist-joint pitch axis 13, a wrist-joint roll axis 14, and a hand 15. The hand 15 including a plurality of fingers actually has a polyarticular structure having a multidegree of freedom of movement. However, the degree of freedom of the hand 15 is set to zero in the present embodiment because the motion of the hand 15 does not greatly contribute to or affect attitude-stability-control and walking-motion-control of the legged robot 100. Therefore, each upper limb has seven degrees of freedom of movement, according to the present embodiment.

The trunk has three degrees of freedom of movement at a trunk pitch axis 5, a trunk roll axis 6, and a trunk yaw axis 7.

The lower limbs each have degrees of freedom at a hip-joint yaw axis 16, a hip-joint pitch axis 17, a hip-joint roll axis 18, a knee-joint pitch axis 19, and an ankle-joint pitch axis 20, an ankle-joint roll axis 21, and a foot (sole of a foot) 22. The intersections between the hip-joint pitch axes 17 and the hip-joint roll axes 18, respectively, define the positions of the hip joints of the legged robot 100 according to the present embodiment. Each foot of a human body has a polyarticular structure having a multidegree of freedom of movement. However, the degree of freedom of each foot 22 of the legged robot 100 is set to zero, according to the present embodiment. Therefore, each lower limb has six degrees of freedom of movement, according to the present embodiment.

The overall legged-robot 100 according to the present embodiment has 3+7×2+3+6×2=32 degrees of freedom of movement. However, the number of degrees of freedom of the legged robot 100 is not limited to thirty-three, and the degree of freedom, that is, the number of joints may be increased or decreased as required in designing and manufacturing and according to the required specifications.

The above-described degrees of freedom at the joints of the legged robot 100 are practically represented in actions of the actuators. The joint-actuators are preferably small and lightweight because the appearance of the legged robot 100 must be free from unnatural projections so as to resemble a human being and due to various requirements so that position-control of the movement of an instable two-legged robot can be easily performed. According to the present embodiment, small direct-gear-coupling-type AC servo-actuators, in which one-chip servo-control systems are built in motor units, are mounted. The small AC servo-actuator applicable to a legged robot is disclosed in, for example, Japanese Patent Application No. 11-33386, the right of which has been transferred to the assignee of the present invention.

Figure 4:
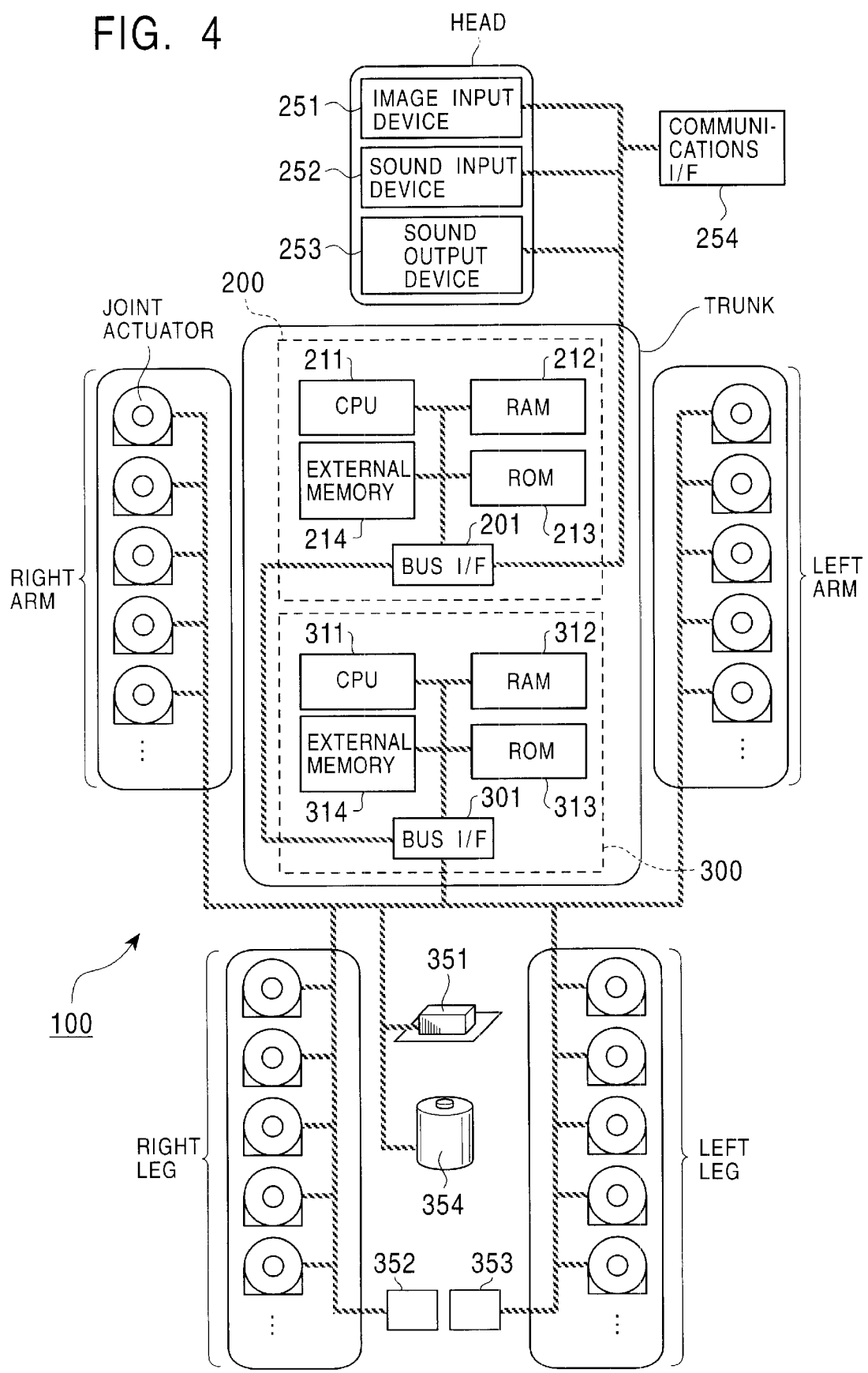
FIG. 4 is a schematic view of a control system for controlling the legged robot 100 according to the embodiment of the present invention.

FIG. 4 is a schematic view of a control system of the legged robot 100 according to the embodiment of the present invention. The control system includes a thought-control module 200 which manages emotional decision and expressions in dynamic response to user-inputs and the like, and a motion-control module 300 which controls coordinate motions, such as movements of the joint-actuators, of the overall legged robot 100.

The thought-control module 200 is an independent data-processing device which can perform self-complete processing, the thought-control module 200 including a CPU (central processing unit) 211 for computation-processing emotional decision and expression, a RAM (random access memory) 212, a ROM (read only memory) 213, and an external storage device (hard disc drive or the like) 214.

The thought-control module 200 is provided with various devices including an image input device 251 such as a CCD (charge coupled device), a sound input device 252 such as a microphone, a sound output device 253 such as a speaker, a communications interface 254 for exchanging data with a system outside the legged robot 100, and the like which are connected to the thought-control module 200 via a bus interface 201. The sound input device 252 and the sound output device 253 may be integrated into one device which has sound input and output functions.

The thought-control module 200 determines actual emotion and intention of the legged robot 100 in accordance with stimuli from the outside such as visual data inputted via the image input device 251 and auditory data inputted via the sound input device 252. The thought-control module 200 outputs an instruction to the motion-control module 300 so that the legged robot 100 behaves or acts, that is, moves its limbs in accordance with the determination of the emotion and intention.

The motion-control module 300 is an independent data-processing device which can perform self-complete processing, the motion-control module 300 including a CPU (central processing unit) 311 for controlling coordinate motions of the overall legged robot 100, a RAM (random access memory) 312, a ROM (read only memory) 313, and an external storage device (hard disc drive or the like) 314. The external storage device 314 can store, for example, various motion patterns using the limbs and so-called "gaits" (a "gait" is a technical term used in this field, which represents "time-series variations in the angle of a joint").

The motion-control module 300 is provided with various devices, such as the joint-actuators for realizing the degrees of freedom of the joints disposed in the overall legged robot 100 (see FIG. 3), an attitude sensor 351 for determining the attitude and inclination of the trunk, landing-confirmation sensors 352 and 353 for detecting the landing to and separation from the floor of soles of the feet, and a power-source control device 354, which are connected to the motion-control module 300 via a bus interface 301.

The motion-control module 300 controls the coordinate motions of the overall legged robot 100 driven by the joint-actuators, which are instructed by the thought-control module 200. That is, the CPU 311 extracts a motion pattern corresponding to the motion instructed by the thought-control module 200 from the external storage device 314, or internally forms the motion pattern. The CPU 311 sets the motion of the legs, the track of a ZMP (zero moment point), the motion of the trunk, the motion of the upper limbs, and the horizontal position and height of the hip joints, and transfers command values to the joint-actuators, thereby instructing motions in accordance with the thus set values. The term "ZMP" represents a point of the floor at which the moment produced by a reaction force of the floor when walking becomes zero. The "track of a ZMP" represents a track along which the ZMP moves when, for example, the legged robot 100 walks.

The CPU 311 determines the attitude and inclination of the trunk of the legged robot 100 from an output signal of the attitude sensor 351. The CPU 311 detects whether each foot is separated from the floor or is placed on the floor by output signals from the landing-confirmation sensors 352 and 253, whereby the coordinate motions of the overall legged robot 100 can be properly controlled.

The motion-control module 300 performs feed-back to the thought-control module 200 of the motions, that is, the result of processing performed in accordance with the thought of the thought-control module 200.

The thought-control module 200 and the motion-control module 300 are formed on a common platform, and are connected to each other via the bus interfaces 201 and 301.

Figure 5:
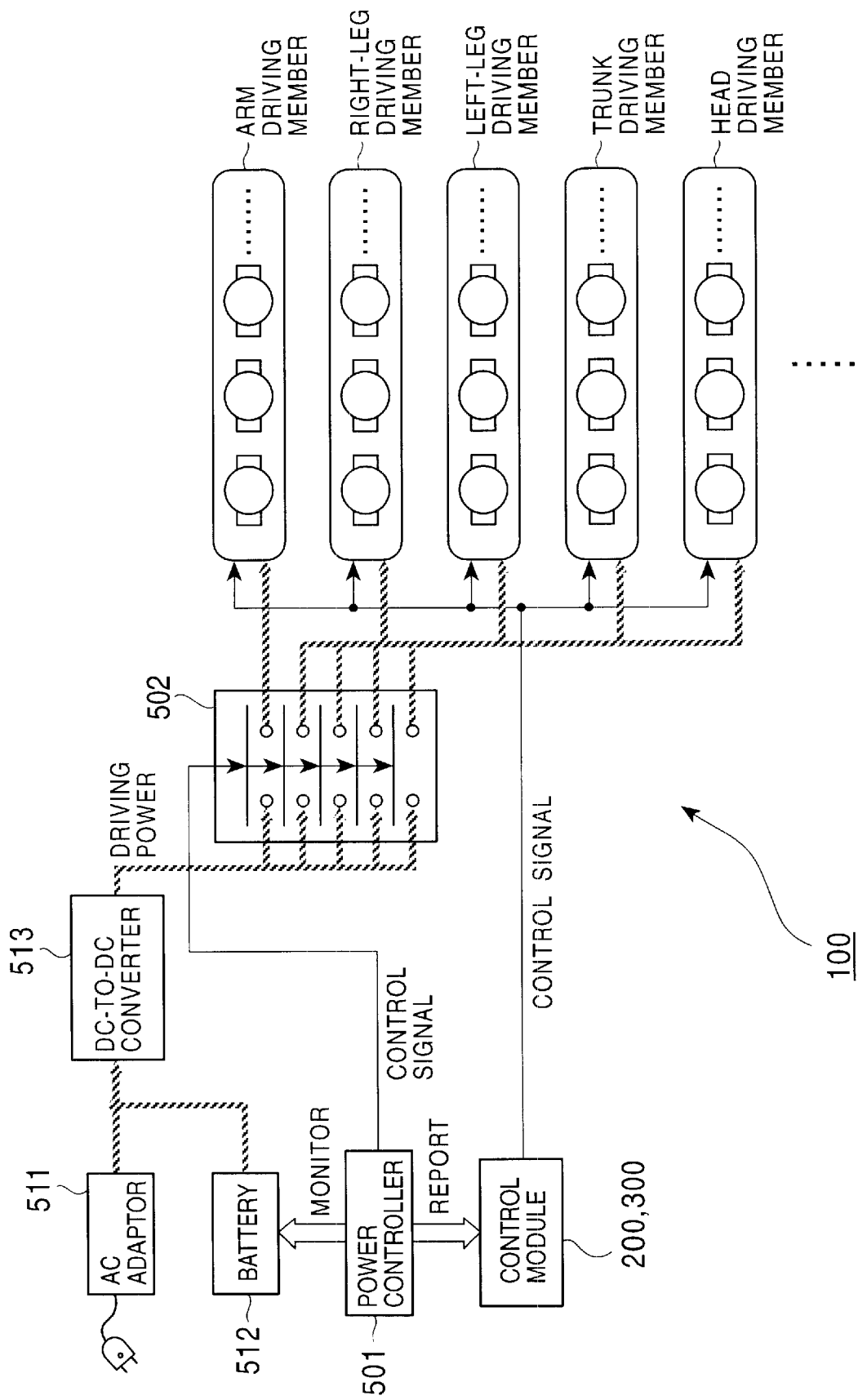
FIG. 5 is a schematic view of a power-supply control system of the legged robot 100 according to the embodiment of the present invention.

FIG. 5 is a schematic view of a power-supply control system of the legged robot 100 according to the embodiment.

The legged robot 100 can be driven by commercial alternating current supplied via an AC adaptor 511 or a battery 512 as a major power source. The power from these major power sources is supplied via a DC-to-DC converter 513 in a direct current having a predetermined voltage, and is distributed to the driving members of the arms, legs, trunk, and the like which consume power. The driving members are formed with the joint-actuators, driving circuits thereof, encoders for measuring the motions of the joint-actuators, and the like.

However, the description of a case in which the commercial alternating current is used is omitted because it is not the case of the present invention.

The battery 512 is a rechargeable secondary battery, and is formed with a plurality of cells in a battery pack. Since a large inrush current is required when the joint-actuators start to move, a nickel-hydrogen (NiMH) battery, which can supply relatively a large current in a short time, is preferably used as the secondary battery.

A power controller 501 continuously monitors charged and discharged states of the battery 512, and reports detected results to the motion-control module 300 or the thought-control module 200. The motion-control module 300 or the thought-control-module 200 receives the report, and corrects action plans in accordance with the state, that is, the remaining capacity of the battery. The state of the battery can be determined by measuring, for example, the terminal voltage of the battery 512, input and output current, the temperature around the cells, and the like.

A power supply-block unit 502 is disposed on a line between the output (driving power) side of the DC-to-DC converter 513 and the driving members. The power supply-block unit 502 can supply and block the driving power to each driving member according to the control signal from the power controller 501. Detailed processing of the power control is described below.

The power controller 501 and the power supply-block unit 502 may be included in the power control device 354 (see FIG. 4).

Figure 6:
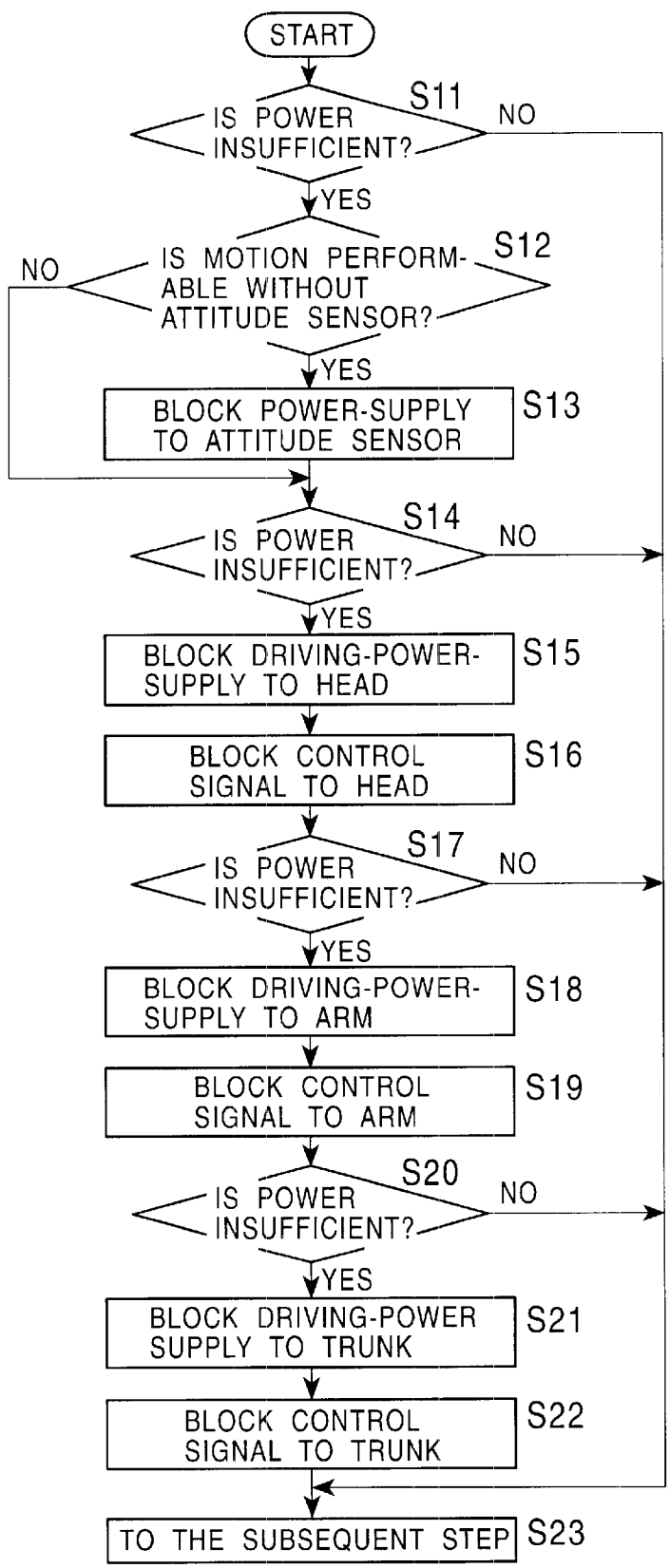
FIG. 6 is a flowchart showing an example of a power-controlling operation of the legged robot 100 according to the embodiment of the present invention.

FIG. 6 is a flowchart showing an example of a power-controlling operation of the legged robot 100 according to the embodiment of the present invention. The power-controlling operation is described below with reference to the flowchart.

The power controller 501 continuously monitors the remaining capacity of the battery. When the thought-control module 200 or the motion-control module 300 (hereinafter referred to as a control module 200/300) receives a report of the power controller 501 that the remaining capacity of the battery is sufficient (step S11), the process proceeds to the subsequent step by skipping the power control operation in step S12 and so on (step S23).

When the control module 200/300 receives a report of the power controller 501 that the remaining capacity of the battery is insufficient (step S11), the process proceeds to step S12. In step S12, the control module 200/300 determines whether or not a motion being actually performed requires a sensor output from the attitude sensor 351 concerning the attitude and inclination of the trunk.

When the result of the determination in the determining step S12 is negative, supply of the power to the attitude sensor 351 is blocked (step S13) for power saving. The supply of the power is blocked by an output of a predetermined control signal to the power supply-block unit 502 in the same way as in the below-described cases. When the result of the determination is affirmative, the process skips step S13.

The control module 200/300 again determines whether or not the remaining capacity of the battery is sufficient, that is, whether or not the power is sufficient in accordance with the report of the power controller 501 (step S14).

When determined that the power is insufficient, the driving power to a head unit is blocked in which a motion using legs such as walking can be continued without being significantly affected, whereby the motion of the head unit is suspended (step S15). Control signals such as driving instructions to the joint-actuators disposed in the head unit are blocked (step S16) for power saving. When blocking the power supply to the head unit, the power to the image input device 251, the sound input device 252, the sound output device 253, and the communications interface 254, which are disposed in the head unit other than the joint-actuators, may also be blocked.

The control module 200/300 again determines whether or not the remaining capacity of the battery is sufficient, that is, whether or not the power is sufficient in accordance with the report of the power controller 501 (step S17)

When determined that the power is insufficient, the driving power to an arm unit is blocked of which the effect to the motion using legs such as walking is smallest next to that of blocking the driving power to the head unit, whereby the motion of the arm unit is suspended (step S18). Control signals such as driving instructions to the joint-actuators disposed in the arm unit are suspended (step S19) for power saving.

The control module 200/300 again determines whether or not the remaining capacity of the battery is sufficient, that is, whether or not the power is sufficient in accordance with the report of the power controller 501 (step S20).

When determined that the power is insufficient, the driving power to a trunk unit is blocked of which the effect to the motion using legs such as walking is smallest next to that of blocking the driving power to the arm unit, whereby the motion of the trunk unit is suspended (step S21). Control signals such as driving instructions to the joint-actuators disposed in the trunk unit are suspended (step S22) for power saving.

After the above-described processes for power saving, the process proceeds to the subsequent step of motion (step S23).

Figure 7:
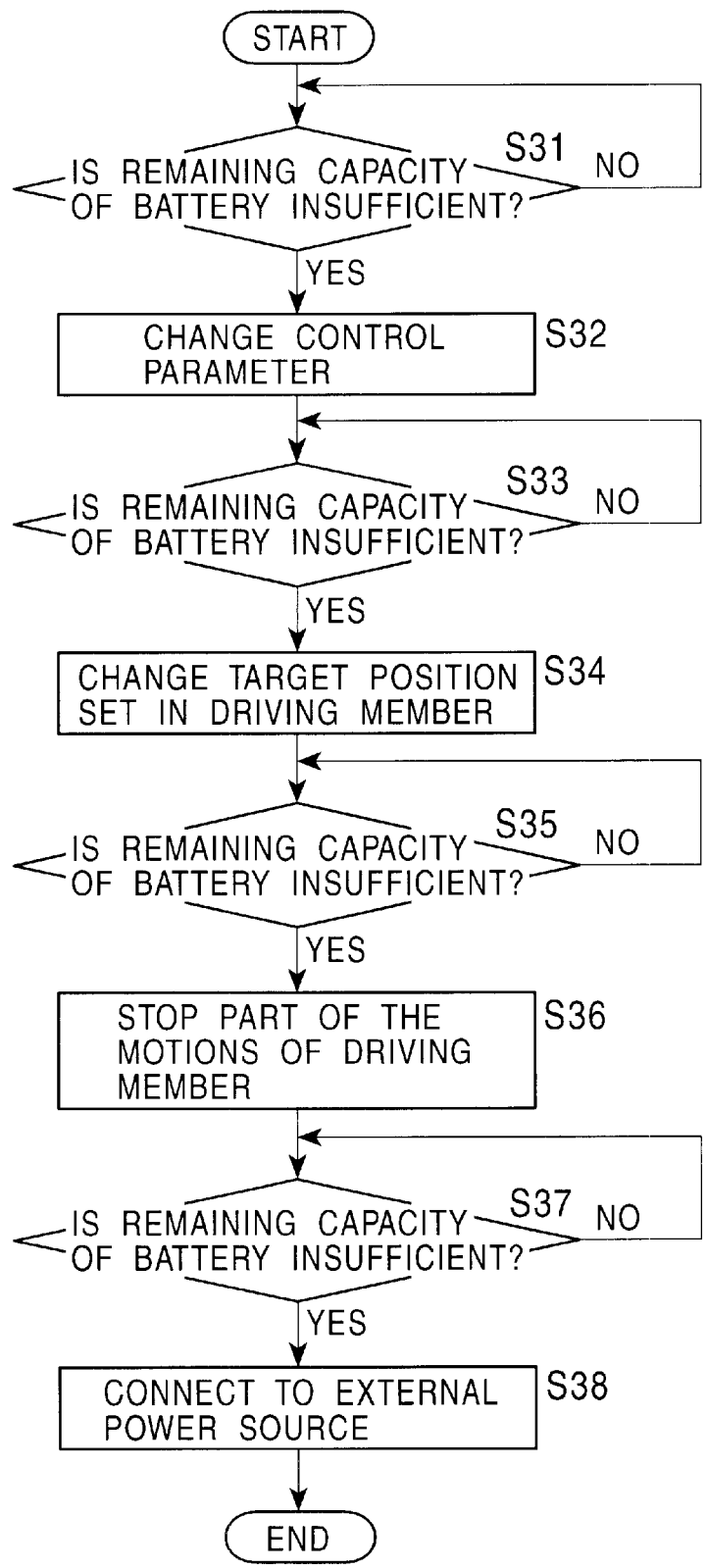
FIG. 7 is a flowchart showing another example of the power-controlling operation of the legged robot 100 according to the embodiment of the present invention.

FIG. 7 is a flowchart showing another example of the power-controlling operation of the legged robot 100 according to the embodiment. The power-controlling operation is described below with reference to the flowchart.

The power controller 501 continuously monitors the remaining capacity of the battery. The control module 200/300 waits for a report of the power controller 501 that the remaining capacity of the battery is insufficient (step S31).

When the control module 200/300 receives a report that the remaining capacity of the battery has decreased below a predetermined value, the control module 200/300 changes a control parameter which is used for drive-control by at least one driving member (step S32). As a result, the power consumption by the corresponding driving member decreases, whereby the load to the battery 512 as a major power source is reduced, that is, the life of the battery is extended.

The control module 200/300 again waits for a report of the power controller 501 that the remaining capacity of the battery has decreased below a predetermined value (step S33).

When the control module 200/300 receives the report of the power controller 501 that the remaining capacity of the battery has decreased below the predetermined value, the control module 200/300 changes a target position of movement set for at least one driving member (step S34). The new target position of movement described above is, for example, a charging station (not shown) which serves to charge the battery 512 or an AC socket to which the AC adaptor 511 is applied.

When changing the target position of movement, the legged robot 100 must suspend a motion which the legged robot 100 is actually performing and become in a waiting mode. The legged robot 100 is preferably maintained in a state as it was when the motion was suspended so that the motion can be smoothly restarted when the power recovers.

The control module 200/300 again waits for a report of the power controller 501 that the remaining capacity has decreased below a predetermined value (step S35).

When the control module 200/300 receives the report of the power controller 501 that the remaining capacity of the battery has decreased below the predetermined value, the control module 200/300 suspends the motion of at least one driving member (step S36). The driving member of which the motion is suspended is preferably a driving member for a sensor, the head unit, the arm unit, or the trunk unit, of which the suspension of movement does not significantly affect the motion of the leg unit such as walking. Thus, the power to be consumed by the overall system can be more reduced while performing the motion to the target position newly set in step S34. When blocking the power supply to the head unit, the power to the image input device 251, the sound input device 252, the sound output device 253, and the communications interface 254, which are disposed in the head unit other than the joint-actuators, may also be blocked.

The control module 200/300 again waits for a report of the power controller 501 that the remaining capacity has decreased below a predetermined value (step S37).

When the control module 200/300 receives the report of the power controller 501 that the remaining capacity has decreased below the predetermined value, the control module 200/300 connects the legged robot 100 to an external power source (step S38). The above external power source is, for example, the charging station, the AC socket to which the AC adaptor 511 is applied, a spare battery, or the like.

Figure 8:
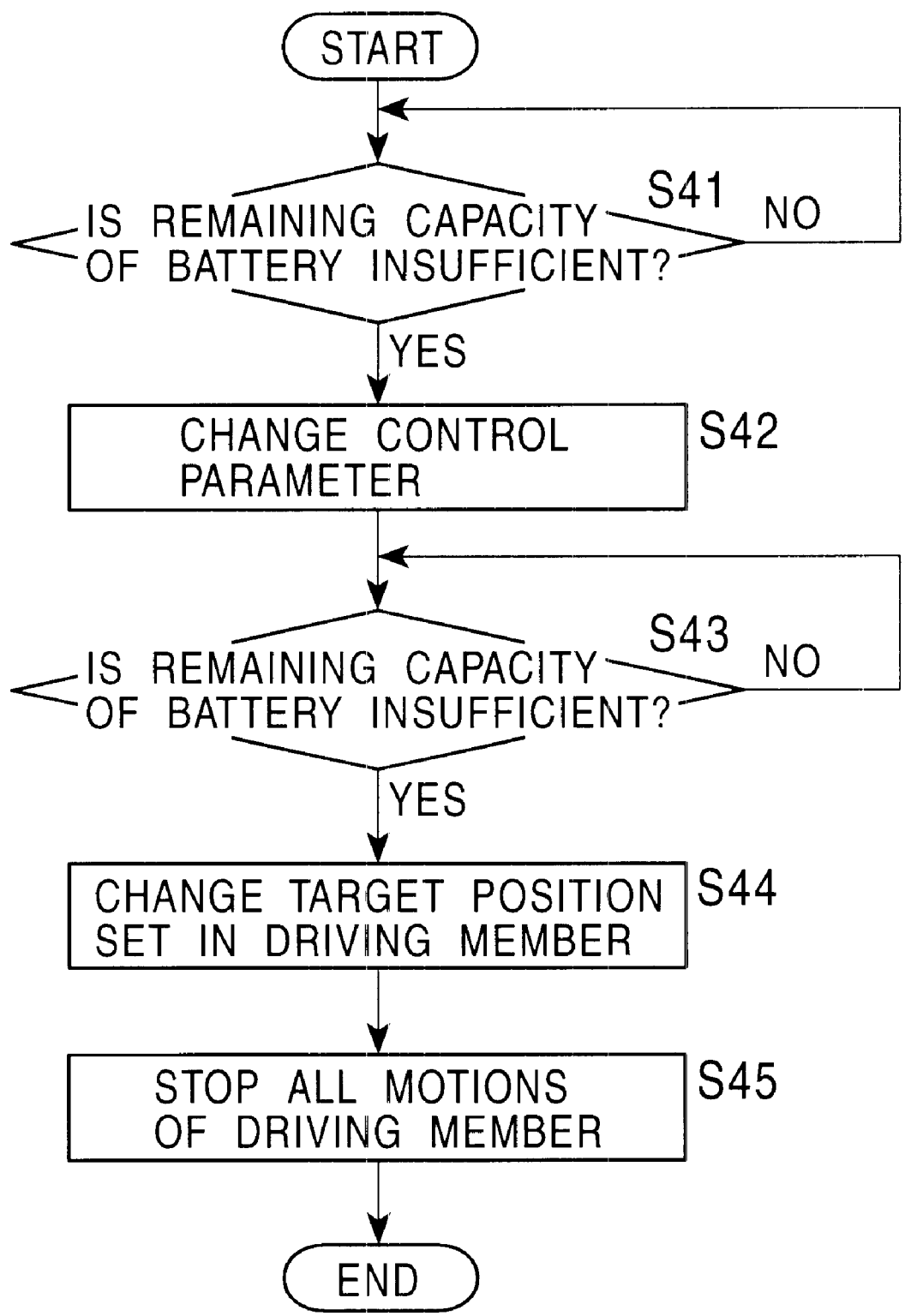
FIG. 8 is a flowchart showing still another example of the power-controlling operation of the legged robot 100 according to the embodiment of the present invention.

FIG. 8 is a flowchart showing still another example of the power-controlling operation of the legged robot 100 according to the embodiment. The power-controlling operation is described below with reference to the flowchart.

The power controller 501 continuously monitors the remaining capacity of the battery. The control module 200/300 waits for a report of the power controller 501 that the remaining capacity of the battery has decreased below a predetermined value, that is, the power is insufficient (step S41).

When the control module 200/300 receives the report that the remaining capacity of the battery has decreased below the predetermined value, the control module 200/300 changes a control parameter which is used for drive-control by at least one driving member (step S42). As a result, the power consumption by the corresponding driving member decreases, whereby the load to the battery 512 as a major power source is reduced, that is, the life of the battery 512 is extended.

The control module 200/300 again waits for a report of the power controller 501 that the remaining capacity has decreased below a predetermined value (step S43).

When the control module 200/300 receives the report of the power controller 501 that the remaining capacity of the battery has decreased below the predetermined value, the control module 200/300 changes the target position of movement set in at least one driving member (step S44). The target position of movement described above is, for example, an attitude or a motion pattern by which a dangerous state such as tumbling can be avoided even when the battery 512 is completely discharged and the power supply is suspended.

When the movement to the newly set target position is completed, all the motions of the driving members are suspended (step S45), thereby preparing for a case in which the battery 512 is completely discharged.

Figure 9:
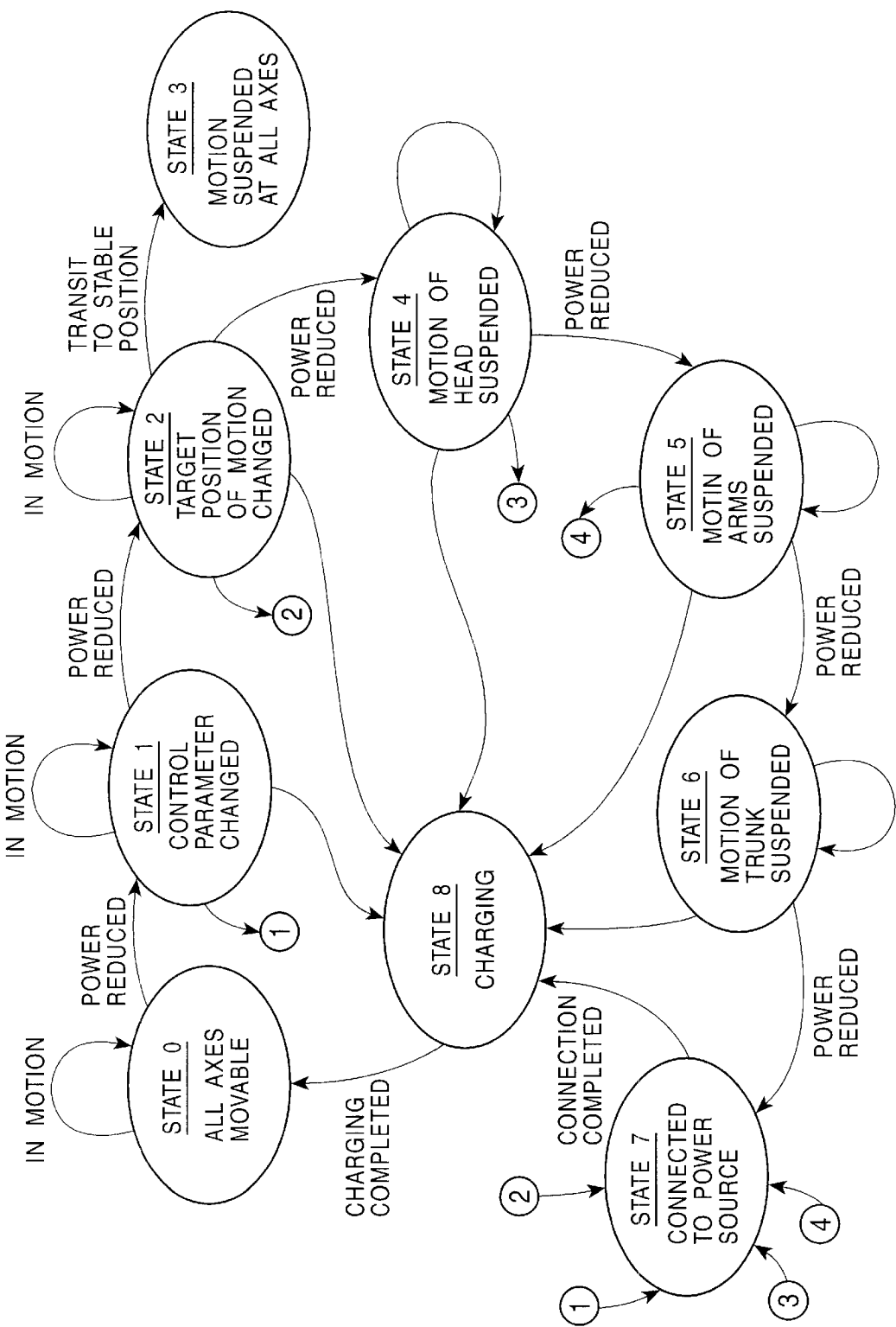
FIG. 9 is an illustration showing the state transition of a further example of the power-controlling operation of the legged robot 100 according to the present invention.

FIG. 9 is an illustration showing the state transition of a further example of the power-controlling operation of the legged robot 100 according to the embodiment. The power-controlling operation is described below with reference to a state transition diagram shown in FIG. 9.

In state 0, the joint-actuators are movable at all the axes.

When power decrease is detected in state 0, the state changes to state 1 in which a control parameter used by at least one driving member is changed. As a result, power consumption in the corresponding driving member decreases, whereby a motion can be continued in a state in which the load to the battery 512 is reduced, that is, the life of the battery 512 is extended.

State 1 may change directly to state 8 in which the battery 512 is charged. State 1 may change to state 7 in which the legged robot 100 is connected to the charging station or the AC source, then, to state 8 for charging the battery 512. When charging is completed, the state returns to state 0 in which full operation is possible at all the axes.

When power decrease is detected in state 1, the state changes to state 2 in which a target position is changed. A new target position is, for example, the charging station for charging the battery 512, or the AC socket to which the AC adaptor 511 is applied. The new target position may be an attitude or a motion pattern by which a dangerous state such as tumbling can be avoided even when the battery 512 is completely discharged and the power supply is suspended.

Figure 10:
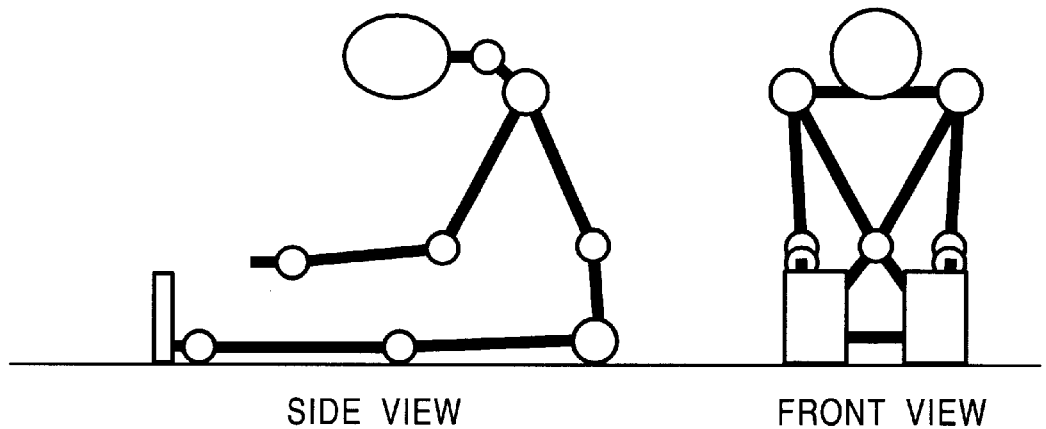
FIG. 10 is an illustration of the legged robot 100 in a stable position. In particular, the illustration shows the legged robot 100 sitting down.
Figure 11:
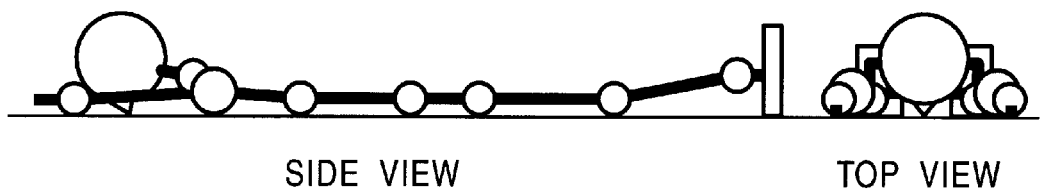
FIG. 11 is an illustration of the legged robot 100 in another stable position. In particular, the illustration shows the legged robot 100 lying on its face.
Figure 12:
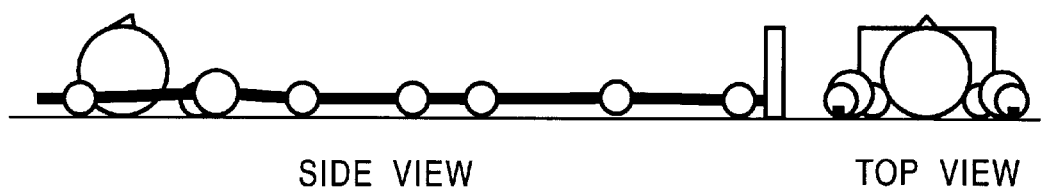
FIG. 12 is an illustration of the legged robot 100 in still another stable position. In particular, the illustration shows the legged robot 100 lying on its back.

When the new target position is the attitude or motion pattern for avoiding the dangerous state, the legged robot 100 is maintained in a stable position, and the state changes to state 3. FIGS. 10 to 12 show the legged robot 100 in stable positions. FIG. 10 shows the legged robot 100 sitting down. FIG. 11 shows the legged robot 100 lying on its face. FIG. 12 shows the legged robot 100 lying on its back. It is not necessary for the driving members of the leg unit and the like to operate (to consume power) so as to maintain the legged robot 100 in any stable position shown in FIGS. 10 to 12. Since the center of gravity of the legged robot 100 in any of these stable positions is sufficiently low, a risk of damaging the legged robot 100 and an object with which the legged robot 100 collides by tumbling can be avoided.

State 2 may change directly to state 8 in which the battery 512 is charged. State 2 may change to state 7 in which the legged robot 100 is connected to the charging station or the AC source, then, to state 8 for charging the battery 512. When charging is completed, the state returns to state 0 in which full operation is possible at all the axes.

When power decrease is detected in state 2, the state changes to state 4 in which the motion of the head unit is suspended in which the motion using legs such as walking can be continued without being significantly affected. The driving instructions and control signals to the joint-actuators in the head unit are blocked, whereby the power consumption of the overall system is reduced, and the operation can be continued while reducing the load to the battery 512, that is, the life of the battery 512 can be extended. When blocking the power supply to the head unit, the power to the image input device 251, the sound input device 252, the sound output device 253, and the communications interface 254 which are disposed in the head unit other than the joint-actuators may also be blocked.

State 4 may change directly to state 8 in which the battery 512 is charged. State 4 may change to state 7 in which the legged robot 100 is connected to the charging station or the AC source, then, to state 8 for charging the battery 512. When charging is completed, the state returns to state 0 in which full operation is possible at all the axes.

When power decrease is detected in state 4, the state changes to state 5 in which the motion of the arm unit is suspended of which the effect to the motion using the legs such as walking is smallest next to that of blocking the driving power to the head unit. The driving instructions and control signals to the joint-actuators in the arm unit are blocked, whereby the power consumption of the overall system is reduced, and the operation can be continued while reducing the load to the battery 512, that is, the life of the battery 512 can be extended.

State 5 may change directly to state 8 in which the battery 512 is charged. State 5 may change to state 7 in which the legged robot 100 is connected to the charging station or the AC source, then, to state 8 for charging the battery 512. When charging is completed, the state returns to state 0 in which full operation is possible at all the axes.

When power decrease is detected in state 5, the state changes to state 6 in which the motion of the trunk unit is suspended of which the effect to the motion using the legs such as walking is smallest next to that of blocking the driving power to the arm unit. The driving instructions and control signals to the joint-actuators in the trunk unit are blocked, whereby the power consumption of the overall system is reduced, and the operation can be continued while reducing the load to the battery 512, that is, the life of the battery 512 can be extended.

State 6 may change directly to state 8 in which the battery 512 is charged. State 6 may change to state 7 in which the legged robot 100 is connected to the charging station or the AC source, then, to state 8 for charging the battery 512. When charging is completed, the state returns to state 0 in which full operation is possible at all the axes.

While the present invention has been described in connection with the preferred embodiments, it will be obvious to those skilled in the art that various modifications of and substitutions for the embodiments may be made without departing from the spirit and scope of the invention.

Although a man-shaped and two-legged robot has been described according to the embodiment, the present invention is not limited to this type of robots, and it is applicable to other types of legged robots and robots other than the legged robots.

The present invention has been described by way of examples only, and is not limited to the specific embodiments thereof, which should be determined solely by the appended claims.

What is claimed is:

1. A battery-driven legged robot which comprises at least one movable leg unit and at least one driving member including the driving member for driving a trunk, the legged robot comprising:

control means for outputting a control signal for instructing driving of the driving member;

power-control means for monitoring the state of a battery; and power supply-block means for supplying and blocking driving power to the driving member in accordance with the state of the battery monitored by the power-control means.

2. A battery-driven legged robot according to claim 1, wherein said control means blocks the output of the control signal to the driving member to which the driving power has been blocked.

3. A battery-driven legged robot according to claim 1, further comprising:

at least one device of an attitude sensor, an image input device, and a sound input-output device, wherein the power-control means blocks the driving power to the at least one device of the attitude sensor, the image input device, and the sound input-output device when power of the battery decreases below a predetermined value.

4. A battery-driven legged robot according to claim 1, further comprising:

a head unit, wherein the power-control means blocks the driving power to the head unit before blocking the driving power to the movable leg unit, when power of the battery decreases below a predetermined value.

5. A battery-driven legged robot according to claim 1, further comprising:

an arm unit, wherein the power-control means blocks the driving power to the arm unit, before blocking the driving power to the movable leg unit, when power of the battery decreases below a predetermined value.

6. A battery-driven legged robot according to claim 1, further comprising:

a trunk unit, wherein the power-control means blocks the driving power to the trunk unit before blocking the driving power to the movable leg unit, when power of the battery decreases below a predetermined value.

7. A battery-driven legged robot according to claim 1, wherein the control means provides an instruction to change a control parameter for the at least one driving member when the control means receives information from the power-control means that power of the battery has decreased below a predetermined value.

8. A battery-driven legged robot according to claim 1, wherein the control means changes a controlled motion set for the at least one driving member when the control means receives information from the power-control means that power of the battery has decreased below a predetermined value.

9. A battery-driven legged robot according to claim 8, wherein the change of the controlled motion includes a change of a target position of movement set for the driving member.

10. A battery-driven legged robot according to claim 8, wherein the change of the controlled motion includes suspension of movement of the at least one driving member.

11. A battery-driven legged robot according to claim 8, wherein the change of the controlled motion includes a motion for connecting to an external power supply device.

12. A battery-driven legged robot according to claim 8, wherein the change of the controlled motion includes a movement to a stable position in which the center of gravity of the legged robot is disposed sufficiently low and suspension of the supply of the driving power to substantially all the driving members when the legged robot is in the stable position.

13. A battery-driven legged robot according to claim 1, further comprising:

a head unit;

an arm unit; and a trunk unit, wherein the power-control means blocks the driving power to the head unit, the arm unit, and the trunk unit, one after another, when power of the battery decreases below a predetermined value.

14. A method of controlling a battery-driven legged robot which comprises at least one movable leg unit and at least one driving member including the driving member for driving a trunk, the method comprising the steps of:

monitoring the state of a battery; and switching between supply and blocking of driving power to the at least one driving member in accordance with the state of the battery monitored in the monitoring step.

15. A method of controlling a battery-driven legged robot, according to claim 14, further comprising the step of:

blocking an output of a control signal to the driving member to which the driving power has been blocked.

16. A method of controlling a battery-driven legged robot, according to claim 14, wherein the legged robot further comprises at least one device of an attitude sensor, an image input device, and a sound input-output device; and wherein in said switching step, the driving power to the at least one device of the attitude sensor, the image input device, and the sound input-output device is blocked when determined in the monitoring step that power of the battery has decreased below a predetermined value.

17. A method of controlling a battery-driven legged robot, according to claim 14, wherein the legged robot further comprises a head unit; and wherein in said switching step, the driving power to the head unit is blocked before blocking the driving power to the leg unit, when determined in the monitoring step that power of the battery has decreased below a predetermined value.

18. A method of controlling a battery-driven legged robot, according to claim 14, wherein the legged robot further comprises an arm unit; and wherein in said switching step, the driving power to the arm unit is blocked before blocking the driving power to the leg unit, when determined in the monitoring step that power of the battery has decreased below a predetermined value.

19. A method of controlling a battery-driven legged robot, according to claim 14, wherein the legged robot further comprises a trunk unit; and wherein in said switching step, the driving power to the trunk unit is blocked before blocking the driving power to the leg unit, when determined in the monitoring step that power of the battery has decreased below a predetermined value.

20. A method of controlling a battery-driven legged robot, according to claim 14, further comprising the step of:

providing an instruction to change a control parameter for the at least one driving member when determined in the monitoring step that power of the battery has decreased below a predetermined value.

21. A method of controlling a battery-driven legged robot, according to claim 14, further comprising the step of:

changing a controlled motion set for the at least one driving member when determined in the monitoring step that power of the battery has decreased below a predetermined value.

22. A method of controlling a battery-driven legged robot, according to claim 21, wherein the change of the controlled motion includes a change of a target position of movement set for the driving member.

23. A method of controlling a battery-driven legged robot, according to claim 21, wherein the change of the controlled motion includes suspension of movement of the at least one driving member.

24. A method of controlling a battery-driven legged robot, according to claim 21, wherein the change of the controlled motion includes a motion for connecting to an external power supply device.

25. A method of controlling a battery-driven legged robot, according to claim 21, wherein the change of the controlled motion includes a movement to a stable position in which the center of gravity of the legged robot is disposed sufficiently low and suspension of the supply of the driving power to substantially all the driving members when the legged robot is in the stable position.

26. A method of controlling a battery-driven legged robot, according to claim 14, wherein the legged robot further comprises a head unit, an arm unit, and a trunk unit; and wherein in said switching step, the driving power to the head unit, the arm unit, and the trunk unit is blocked, one after another, when power of the battery decreases below a predetermined value.

* * * * *